United States Patent [19]

Sagane et al.

[11] 4,137,383
[45] Jan. 30, 1979

[54] PROCESS FOR STABILIZING CHLORINE-CONTAINING RESINS

[75] Inventors: Norio Sagane, Osaka; Minoru Kohara; Tomoo Shiohara, both of Kyoto; Yasuhiko Araki, Osaka, all of Japan

[73] Assignee: Sekisui Kagaku Kogyo Kabushiki Kaisha, Osaka, Japan

[21] Appl. No.: 644,684

[22] Filed: Dec. 29, 1975

[30] Foreign Application Priority Data

Dec. 27, 1974 [JP] Japan ................................. 49-3314

[51] Int. Cl.² .......................... C08K 3/12; C08K 3/28; C08K 3/38
[52] U.S. Cl. .................................. 526/24; 260/45.7 P; 260/45.7 R; 260/45.7 ST; 260/45.75 A; 260/45.75 K; 260/45.9 R; 526/17; 526/22; 526/25; 526/26
[58] Field of Search ...................... 260/45.7 R, 45.7 P; 526/17, 24, 27, 29, 45.75 A, 45.7 S, 45.7 P, 25, 26

[56] References Cited

U.S. PATENT DOCUMENTS

| 2,199,992 | 5/1940 | Hale ........................... 526/26 |
| 2,921,046 | 1/1960 | Arlman ..................... 260/45.7 R |
| 3,347,819 | 10/1967 | Meyer et al. ............. 260/45.7 R |
| 3,551,400 | 12/1970 | Yonezu et al. ................ 528/483 |
| 3,696,084 | 10/1972 | Gordon ........................... 526/17 |
| 3,847,853 | 11/1974 | Suzuki et al. .................. 526/17 |
| 4,029,706 | 6/1977 | Crosby ............................ 526/24 |

OTHER PUBLICATIONS

Chevassus et al., The Stabilization of Polyvinyl Chloride, 1963, pp. 3–8.
Penn, PVC Technology, 1962, pp. 7, 8 and 14.

Primary Examiner—Donald E. Czaja
Assistant Examiner—R. A. White
Attorney, Agent, or Firm—Sughrue, Rothwell, Mion, Zinn and Macpeak

[57] ABSTRACT

A process for stabilizing a chlorine-containing resin which comprises contacting a chlorine-containing resin with one or more gaseous hydrides.

4 Claims, No Drawings

PROCESS FOR STABILIZING CHLORINE-CONTAINING RESINS

BACKGROUND OF THE INVENTION

1. Field of the Invention

This invention relates to a process for stabilizing a chlorine-containing resin (hereafter often merely a "resin" or "resins").

2. Description of the Prior Art

Examples of chlorine-containing resins include, for example, polyvinyl chloride; polyvinylidene chloride; a vinyl chloride-vinylidene chloride copolymer having a vinyl chloride content of about 5 to 95% by weight; a vinyl chloride-vinyl acetate copolymer, most generally commercially available with a vinyl-acetate content of 0.4 to 40 wt%, more often 0.5 to 20 wt%; a vinyl chloride-ethylene copolymer, most generally commercially available with an ethylene content of 1 to 15 mole% and an average degree of polymerization of 700 to 1500; chlorinated polyvinyl chloride, most generally commercially available at a chlorine content of 60 to 70 wt%, more often 63 to 68 wt%; and chlorinated polyethylene, most generally commercially available at a chlorine content of 25 to 45 wt%. These materials undergo thermal decomposition during molding, and require a stabilizer to prevent such thermal decomposition.

It is to be noted that the molecular weight of these resins is not particularly important, and all chlorine-containing resins tend to undergo thermal decomposition during molding regardless of their molecular weight. However, resins having a $\overline{P}n$ (an average degree of polymerization) higher than about 500 are considered to be "moldable" resins on a commercial scale, which means that commercially moldable resins would have a molecular weight of 500 × 62.5 for a polyvinyl chloride resin (where 62.5 = molecular weight of vinyl chloride monomer).

Heretofore, inorganic acid salts, higher fatty acid metal salts, and organic tin compounds have generally been used as such stabilizers. However, since these conventional stabilizers are essentially different from chlorine-containing resins, incorporation of these stabilizers into chlorine-containing resins causes various problems in terms of processability, physical properties of the final products and thermal stabilization for long periods of time. Further, since they are incorporated in a solid or liquid state, there is a definite limit to their homogeneous dispersibility in a resin which leads to an uneven distribution of the stabilizer in the resin, i.e., the part of the resin where the distribution of the stabilizer is small is liable to be thermally deteriorated.

In addition, although some of these stabilizers have a sufficient ability to scavenge hydrogen chloride generated upon thermal decomposition of resins, it cannot be expected that the release of hydrogen chloride from resin molecules is positively inhibited, and, therefore, their ability to impart thermal stability to a resin for a prolonged period of time is weak, i.e., based on the viewpoint of the mechanism of the polymerization reaction of conventional monomers in the preparation of a chlorine-containing resin, it can easily be predicted that abnormal structures such as double bonds between carbon atoms, branched structures, residual catalyst and the like will be formed in the resin molecules when release of hydrogen chloride from the resin molecules takes place, particularly at a chlorine atom at an allyl position where the bonding energy is weakest.

Therefore, the mere incorporation of a conventional stabilizer into a chlorine-containing resin does not provide a basic answer to the problem that the release of hydrogen chloride should be inhibited.

SUMMARY OF THE INVENTION

In the light of the above facts, the inventors have conducted various investigations aimed at providing a chlorine-containing resin having excellent thermal stability by a reduction or addition reaction to eliminate the above described abnormal structures in the resin molecules which are formed during polymerization, particularly at carbon-carbon double bonds, and reached the present invention.

One object of this invention is, therefore, to provide a process for stabilizing a chlorine-containing resin by contacting the chlorine-containing resin with at least one gaseous hydride.

DETAILED DESCRIPTION OF THE INVENTION

The gaseous hydrides which can be used in this invention are those hydrides which are gaseous at a temperature below the molding temperature of chlorine-containing resins, i.e., while the molding temperature generally varies depending upon the type of chlorine-containing resin to be molded, it is typically on the order of about 100 to 210° C, e.g., for vinyl chloride-ethylene copolymers it is commonly about 100° C, for polyvinyl chloride it is commonly about 180°–200° C and for chlorinated polyvinyl chloride it is commonly about 190–210° C.

Such gaseous hydrides include, for example, hydrides of boron, e.g., borane, diborane, etc., or derivatives thereof, e.g., dichloroborane, etc.; silane or derivatives thereof, e.g., methylsilane; aluminum hydride; germanium hydride or derivatives thereof, e.g., methyl germanium hydride, dimethyl germanium hydride, etc.; tin hydride or derivatives thereof, e.g., methyltin hydride; hydrogen sulfide; ammonia gas; phosphorus hydride, e.g., phosphine; etc., and similar hydrides which are capable of effecting a reduction or addition reaction. The above hydrides are, in fact, gaseous at ambient temperature.

The process of this invention for stabilizing chlorine-containing resins can be carried out, for example, as follows. A gaseous hydride is filled in a tower charged with a powdery or granular chlorine-containing resin, and the two are allowed to stand in contact with each other for about 1 to 10 days. Air is then blown into the system for a period of about 5 to 20 hours. The reacted gas was reverted to its original gaseous hydride and was then evacuated from the system together with the unreacted gas. In this case, the evacuated gas can be reused. It should be apparent to one skilled in the art that, in fact, it is not per se necessary to replace or purge the gaseous hydride from the chlorine-containing resin after the contact period between the gaseous hydride and the chlorine-containing resin. However, due to the relatively high cost of gaseous hydrides, typically the process of the present invention is rendered most economical if the gaseous hydride is recovered and reused.

It is to be specifically understood that in accordance with the present invention the time period of gaseous hydride/ chlorine-containing resin contact and the time period of the air blowing are not limited to the above described values. As will be appreciated, the contact time between gaseous hydride/ chlorine-containing resin generally varies with the temperature utilized and the pressure utilized, but typically about 30 minutes to about 6 hours will suffice for industrial scale operation.

Contact of the gaseous hydride with the chlorine-containing resin is conveniently conducted at about one atmosphere, and unless it is desired to increase the output of stabilized product per unit time, little is to be gained by utilizing the gaseous hydride at super-atmospheric pressures. However, if desired, a pressurized system can be utilized to accelerate the treatment rate. The maximum pressure of operation is not limited by the mechanism of the stabilization, but considering the extra cost involved in obtaining equipment suitable for extreme high-pressure operation, usually a pressure no greater than about 100 atms. will be utilized. Little is to be gained by operation at sub-atmospheric pressures, though if one wishes to utilize sub-atmospheric pressures the mechanism of the stabilization of the present invention does not prohibit the same. Practically speaking, such will seldom, if ever, be utilized.

The contact of the gaseous hydride and the chlorine-containing resin is most conveniently performed at room temperature, but if it is desired to increase the output of stabilized product per unit time, it is possible to use temperatures above room temperature, for example, temperatures of 30 to 100° C can be used with success, although this range is not limitative, to accelerate the rate of output of stabilized product.

As will be apparent from the above discussion, while elevating the temperature or elevating the pressure of contact both serve to decrease the treatment time required for the stabilization, by using elevated pressures in combination with elevated temperatures the treatment time for the stabilization can be even further reduced.

One important requirement for the contacting is that air present in the tower after the tower is filled with resin should be replaced with the gaseous hydride, since air remaining in the tower generally adversely effects the diffusion of the gaseous hydride. It is no, however, necessary to use 100% gaseous hydride and, if desired, the hydride can be diluted with an inert gas such as hydrogen, nitrogen, and the like, though it is preferred that the hydride concentration be at least about 5 to 10% if such an inert gas mixture is used.

Excellent results in accordance with the present invention are obtained when the resin to be stabilized is merely filled in granular form into a tower and gaseous hydride is then introduced into the tower so as to fill-in voids between the chlorine-containing resin particles and voids present in the resin particles.

While in the above embodiment air blowing is called for after contact, it should be clear to one skilled in the art that other gases can be used in addition to air, as this is essentially a purging of the reaction system. Typically, air blowing is at room temperature (though nothing would prohibit the use of higher or lower temperatures) and at a pressure slightly higher than atmospheric pressure, for example, 1.1 atm., to drive off gas used in the treatment.

In addition, it is particularly preferred that the air or, for example, air containing additional nitrogen, hydrogen or a mixture thereof, have a moisture content similar to that normally encountered at standard temperature and pressure conditions. While air per se (dry air) can be used to purge gaseous hydride which has not been reacted with chlorine-containing resin which has an abnormal structure, if air containing moisture is utilized one obtains a chlorine-containing resin which is more thermally stable. It is not preferred to use $O_2$ gas because of the possibility of forming an explosive mixture.

Further, while in the above embodiment a tower was utilized to contact the gaseous hydride with the chlorine-containing resin, it should further be apparent to one skilled in the art that the stabilization treatment of the present invention is not necessarily conducted in a closed system as described above but may be carried out in a continuous fashion, and, in fact, continuous processing in many instances will be preferred. For example, the chlorine containing resin can be contacted with one or more gaseous hydrides while the chlorine-containing resin is being transferred into a tank for shipping, into a storage tank or, in fact, while being transferred to a molding apparatus via various conduits used for such transferring. Such continuous processing is effected merely by substituting one or more gaseous hydrides for the air contained therein, or by contacting the resin with one or more gaseous hydrides.

Granular chlorine-containing resins as are conventionally used in the art can be processed according to the present invention. The size generally varies depending upon the type of resin and method of polymerization. For example, polyvinyl chloride obtained by suspension polymerization generally has a particle size in the range of from about 1 to about 100 $\mu$, and this is a commonly encountered size range for chlorine-containing resins in general. However, the particle size is not critical to the stabilization process of this invention.

Thus, according to the stabilization treatment of the present invention, abnormal structures in the chlorine-containing resin molecules such as a double bond between carbon atoms, a branched structure, residual catalyst and the like, particularly the double bond between carbon atoms, are considered to undergo a reduction or addition reaction with the above described gaseous hydride, thereby eliminating parts of the chlorine-containing resin molecules where the bonding energy of hydrogen atoms are weak due to abnormal structures. As a result, a chlorine-containing resin of excellent thermal stability can be obtained.

The present invention is therefor entirely different from conventional stabilizing methods in which stabilizers are incorporated in the chlorine-containing resin, i.e., resins are treated with hydrides in a gaseous state thus using a gaseous substance to stabilize the resin structure per se. The present invention makes it possible to provide a resin of high thermal stability without employing any stabilizer present in the final product. The present invention also makes it possible to decrease residual monomer(s) remaining unreacted in the resin molecules, i.e., the carbon-carbon double bond in the remaining monomer undergoes a reduction or addition reaction, whereby the monomer is converted into a substance chemically different from the original monomer.

The present invention will now be illustrated in greater detail with reference to several Examples, but they are given for illustrative purposes only and are not to be construed as limiting the present invention. In the Examples, all parts, percentages, ratios and the like are by weight unless otherwise indicated.

EXAMPLE 1

100 g of a polyvinyl chloride powder (chlorine content = the theoretical value as pure polyvinyl chloride)

having an average degree of polymerization of 1100 (hereinafter, the same resin powder was used in all Examples unless otherwise indicated) and a particle size distribution of 1 to 100 μ was charged into a 300 ml glass tower. Thereafter, 900 ml of diborane gas as an active hydride was introduced from a conduit at the lower part of the tower by opening the conduit. Confirming that the diborane gas effused from a conduit at the upper part of the tower, both the lower and upper conduits were then closed and the system allowed to stand for about 3 days at normal room temperature and at about 1 atmosphere. Both conduits were then opened, and 60 l of air was introduced into the system from the inlet conduit for about 5 hours at room temperature, using a compressor so as to introduce the air under slightly pressurized conditions (about 1.1 atm.) while maintaining the air feed rate constant to displace unreacted diborane gas. The diborane gas removed (purged) after the reaction was forwarded from the outlet to a gas-air liquefying tank where the diborane gas was recovered in a liquid state, and then reused. 2 g aliquots of the thus treated polyvinyl chloride resin powder were placed in a test tube, and the tubes immersed in an oil bath at 200° C. Each tube was then taken up at 5 minute intervals and subjected to thermal resistance testing wherein the color of each sample was observed. The results obtained are shown in Table 1 below.

For comparison, the results obtained in the same manner as described above but using untreated polyvinyl chloride powder, or a mixture of 100 parts of untreated polyvinyl chloride powder, and 0.5, 1.0 or 2.0 parts of dioctyl tin bis(2-ethylhexylthioglycolic acid ester mercaptide) as a stabilizer are also shown in Table 1 as Comparative Examples 1 to 4.

minutes in the above thermal resistance testing, whereas the untreated polyvinyl chloride began to undergo a color change in 1 minute, and changed to reddish brown in 5 minutes. Further, the treated polyvinyl chloride of Example 1 also exhibited a superior thermal stability in comparison to the results obtained in Comparative Example 4 wherein 2 parts of dioctyl tin bis(2-ethylhexylthioglycolic acid ester mercaptide), which is presently known as the most effective stabilizer for polyvinyl chloride resins to prevent coloring, was added to 100 parts of the polyvinyl chloride.

EXAMPLE 2

10 g of untreated polyvinyl chloride powder was placed in an Erlenmeyer flask, and immersed in an oil bath at 200° C for 15 to 20 minutes (heat treatment) resulting in a color change to reddish brown to dark brown. The thus colored powder was then subjected to the treatment described in Example 1, whereby the color returned to its original white color.

The white powder thus obtained was dissolved in tetrahydrofuran as a solvent, and the ultraviolet absorption spectrum was determined. Comparing the results obtained with those of the heat-treated colored powder, the heat-treated powder showed an absorption due to a polyene group, whereas there was no absorption due to a polyene group with respect to the powder which had been treated as described in Example 1 with diborane gas after the heat treatment.

From the above results, it can be assumed that a dehydrochlorination reaction took place during the heat treatment of the untreated polyvinyl chloride, resulting in the formation of a polyene structure in the resin molecules which caused coloring, but by treating the thus Table 1

| | Example 1 | Comparative Example No. | | | |
|---|---|---|---|---|---|
| | | 1 | 2 | 3 | 4 |
| Composition (parts by weight) | | | | | |
| Polyvinyl chloride treated with diborane | 100 | | | | |
| Untreated polyvinyl chloride | | 100 | 100 | 100 | 100 |
| Dioctyl tin bis (2-ethylhexyl- thioglycolic acid ester mercaptide) | | | 0.5 | 1.0 | 2.0 |
| Color of powder after thermal resistance testing (Sampled at time indicated below) | | | | | |
| 5 (min.) | white | reddish brown | orange | white | white |
| 10 (min.) | white | reddish | orange | white | white |
| 15 (min.) | white | reddish brown | ocher | yellow | pale yellow |
| 20 (min.) | pale yellow | dark brown | dark yellow | ocher | pale yellow |
| 25 (min.) | pale yellow | blackish brown | dark yellow | yellow-ish green | ocher |
| 30 (min.) | pale yellow | blackish brown | brown | dark yellow-ish green | yellowish green |
| 35 (min.) | yellow | — | dark brown | dark yellow-ish green | dark yellowish green |
| 40 (min.) | ocher | — | dark brown | black | dark yellowish green |
| 45 (min.) | ocher | — | dark brown | black | black |

As will be seen from Table 1, the polyvinyl chloride treated with diborane exhibited highly superior thermal stability as compared to the untreated polyvinyl chloride or the polyvinyl chloride to which a stabilizer was added. That is, the treated polyvinyl chloride of Example 1 maintained its pure white color for more than 15 colored powder (which had begun to undergo thermal deterioration) with diborane gas, the double bond of the polyene structure was eliminated by a selective reduction, thereby obtaining a white powder. Accordingly, it was proven that the process of the present invention makes it possible to eliminate carbon-carbon double bonds of chlorine-containing resin molecules, thereby imparting improved stability to heat and the like to the resins.

EXAMPLE 3

50 g of untreated polyvinyl chloride powder was treated with diborane gas in the same manner as described in Example 1 except for using a total treating time of 5 days. One gram aliquots of the treated polyvinyl chloride were successively taken out after 1, 3 and 5 days and dissolved in 20 ml of tetrahydrofuran. The amounts of residual vinyl chloride monomer were determined by gas chromatography, and the results obtained are shown in Table 2 below. For comparison, the amount of residual vinyl chloride in an otherwise identical but untreated polyvinyl chloride are also shown as Comparative Example 5.

Table 2

| | Amount of Residual Monomer in Polyvinyl Chroride (ppm) | | | |
| --- | --- | --- | --- | --- |
| | | Time for Treating with Diborane | | |
| | No Treatment | 1 day | 3 days | 5 days |
| Example 3 | — | 11.2 | 0.6 | 0.1 |
| Comparative Example 5 | 32.8 | 32.4 | 32.0 | 31.8 |

As is apparent from the results given in Table 2, residual vinyl chloride monomer in the untreated polyvinyl chloride was not substantially decreased upon being allowed to stand in a glass flask while that of the treated polyvinyl chloride according to the present invention was decreased to about one third the original amount by 1 day of treatment, and reached about 0.3% of its original amount after 5 days treatment, indicating the excellent effect of the present invention in removing residual vinyl chloride monomer from polyvinyl chloride resins.

While the invention has been described in detail and with reference to specific embodiments thereof, it will be apparent to one skilled in the art that various changes and modifications can be made therein without departing from the spirit and scope thereof.

What is claimed:

1. A process for stabilizing a chlorine-containing resin which comprises contacting a chlorine-containing resin selected from the group consisting of polyvinyl chloride, polyvinylidene chloride, a vinyl-chloride-vinylidene chloride copolymer, a vinyl chloride-vinyl acetate copolymer, a vinyl chloride-ethylene copolymer, a chlorinated polyvinyl chloride and chlorinated polyethylene with a hydride gaseous at a temperature below the molding temperature of said resin for a period of time sufficient to stabilize the chlorine-containing resin.

2. The process as claimed in claim 1, wherein said hydride is borane or diborane.

3. The process of claim 1, wherein said gaseous hydride is selected from the group consisting of borane, diborane, dichloroborane, silane, methylsilane, aluminum hydride, germanium hydride, methyl germanium hydride, dimethyl germanium hydride, tin hydride, methyl tin hydride, hydrogen sulfide, ammonia gas, and phosphorus hydride.

4. The process as claimed in claim 1, wherein said hydride is boron hydride or a chloro hydride derivative thereof gaseous at a temperature below the molding temperature of said resin, silane or a methyl hydride derivative thereof gaseous at a temperature below the molding temperature of said resin, aluminum hydride, germanium hydride or a methyl or dimethyl hydride derivative thereof gaseous at a temperature below the molding temperature of said resin, tin hydride or a methyl hydride derivative thereof gaseous at a temperature below the molding temperature of said resin, hydrogen sulfide, ammonia gas, or phosphorus hydride.

* * * * *